(12) United States Patent
Horak et al.

(10) Patent No.: US 11,440,294 B2
(45) Date of Patent: Sep. 13, 2022

(54) HEATABLE GLAZING

(71) Applicant: AGC GLASS EUROPE, Louvain-la-Neuve (BE)

(72) Inventors: Pavel Horak, Teplice (CZ); Laurent Goutiere, Court-Saint-Etienne (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 652 days.

(21) Appl. No.: 16/307,818

(22) PCT Filed: May 31, 2017

(86) PCT No.: PCT/EP2017/063145
§ 371 (c)(1),
(2) Date: Dec. 6, 2018

(87) PCT Pub. No.: WO2017/211641
PCT Pub. Date: Dec. 14, 2017

(65) Prior Publication Data
US 2019/0299568 A1    Oct. 3, 2019

(30) Foreign Application Priority Data

Jun. 8, 2016 (EP) .................................... 16173527

(51) Int. Cl.
*B32B 17/10* (2006.01)
*H05B 3/86* (2006.01)

(52) U.S. Cl.
CPC .. *B32B 17/10385* (2013.01); *B32B 17/10036* (2013.01); *H05B 3/86* (2013.01);
(Continued)

(58) Field of Classification Search
CPC ........ B32B 17/10385; B32B 17/10036; H05B 3/86; H05B 2203/011; H05B 2203/014;
(Continued)

(56) References Cited

U.S. PATENT DOCUMENTS

2012/0152930 A1* 6/2012 Chamberlain .... B32B 17/10293
219/203
2015/0035794 A1* 2/2015 Zhitomirskiy ........ G06F 3/0445
345/174

FOREIGN PATENT DOCUMENTS

JP        2000-30847 A       1/2000
WO       2016038372    *    3/2016
WO   WO 2016/038372 A1     3/2016

OTHER PUBLICATIONS

International Search Report dated Aug. 8, 2017, in PCT/EP2017/063145, filed May 31, 2017.

* cited by examiner

*Primary Examiner* — Shawntina T Fuqua
(74) *Attorney, Agent, or Firm* — Oblon, McClelland, Maier & Neustadt, L.L.P.

(57) ABSTRACT

A laminated glazing comprising an assembly including (i) at least a thermoplastic interlayer, (ii) a first busbar laid over the thermoplastic interlayer, (iii) at least one heating wire laid over the first busbar, (iv) a second busbar at least partly laid over the heating wire and at least partly laid over the first busbar, (v) where a solder layer suitable for melting in an autoclave covers at least part of a surface of the first busbar or the second busbar and is arranged to contact the heating wire, and (vi) where the assembly is laminated with at least a glass sheet.

19 Claims, 2 Drawing Sheets

(52) U.S. Cl.
CPC .. *H05B 2203/011* (2013.01); *H05B 2203/014* (2013.01); *H05B 2203/017* (2013.01)

(58) Field of Classification Search
CPC ........ H05B 2203/017; H05B 2203/031; H05B 2214/02
See application file for complete search history.

HEATABLE GLAZING

The present invention relates to heatable glazings and in particular to wire heatable glazings.

It is well known for example in the field of automotive windscreens to provide an array of fine, closely spaced heating wires embedded in an interlayer material between two outer plies, usually of glass.

The heating wires, as an electric circuit, extend between and are in electrical contact with two opposing busbars, typically positioned adjacent to two opposite edges of the glazing.

Thus, at its simplest, an electrically heated window may comprise a heating element particularly fine wires and a pair of spaced opposed busbars, normally one on each of two opposed sides of a face of the window, with the heating element extending between them over the window. Electrical connection to an external power source, for example the power supply from the vehicle, may be made by plug and socket connectors of known type, the plug part of which is generally soldered or otherwise adhered to the busbar.

It is known to use a busbar which comprises a narrow metal strip and a wider metal strip also called busbars which are adapted to carry substantial currents, such that the heating wires are arranged between the two busbars. To improve an electrical connection between the busbar assembly and the heating wires, one of the metal strip may be provided with a low melting point solder layer on part of a surface in contact with the heating wires. Low melting point solder is defined as solder which melts and fills spaces between the heating wires and busbars in an autoclave, i.e. having a melting point not more than 150 degrees C., the maximum autoclave temperature. On solidification, the low melting point solder bonds the heating wires firmly in position and provides a durable electrical connection between both metal strip and the heating wires.

Furthermore, the electric circuit is generally constituted on a ply of interlayer material and particularly a ply of thermoplastic interlayer such as a PVB sheet before lamination. The binding of the two busbars and the wires is finally performed during the autoclave step. To ensure a good binding of the electric circuit, in this case heating wires and the busbars, the heating wires and busbars are pre-bound on the thermoplastic interlayer (PVB), the extremities wires being sandwiched between the two busbars. This pre-binding stage is critical from a manufacturing point of view because it is performed today by punctual soldering on the busbar length, a method with several following drawbacks. Indeed, the process is slow, expensive and generates tin residues and then a global production yield reduction due to thermoplastic interlayer PVB pollution. Furthermore, the adhesion of the busbars is low, thus some electric circuits are damaged when the PVB is stored and positioned before the lamination process.

There remains a need for an alternative glazing, comprising heating wires, having a low in-service failure rate and a corresponding simplified process for manufacture, would be desirable.

The present invention accordingly provides a laminated glazing comprising an assembly which comprises:
at least a ply of a thermoplastic interlayer
a first busbar laid over the ply of interlayer material
at least one heating wire laid over the first busbar
a second busbar at least partly laid over the heating wire and at least partly laid over the first busbar wherein a solder layer suitable for melting in an autoclave covers at least part of a surface of the first busbar or/and the second busbar and is arranged to contact the heating wire.

According to the present invention, the assembly is laminated with at least one glass sheet.

According to the present invention, an adhesive layer is arranged between the first busbar and the second busbar on at least a part of a surface of the first busbar or the second busbar.

Preferably, an adhesive layer is arranged between the first busbar and the second busbar on at least a part of a surface of the second busbar.

Thus, the inventors have shown that the use of a low-melting point busbar combined to an adhesive layer on the first or/and second busbars allows to fasten and improve the pre-binding process of the busbar by a simple and fast tape adhesion during the heated electrical circuit constitution on the ply of interlayer material before the glazing assembly. After this preparation step, the low-melting point alloy will melt during the glass lamination process performed in autoclave to ensure a good contact quality by soldering.

According to one preferred embodiment of the present invention, the adhesive layer is preferably placed all along the first or the second busbars and on a part of its width.

Preferably, the adhesive layer is preferably placed all along the second busbars and on a part of its width.

Preferably, the adhesive layer has thickness in a range 1 μm to 100 μm, more preferably 10 μm to 50 μm. Preferably, an array of heating wires extends between, and is in electrical contact with first and second busbars for supplying electrical power to the array of heating wires.

Preferably, the assembly comprising at least a ply of interlayer material and a first and a second busbars according to the present invention is arranged between a first and second plies of glazing material (glass sheet).

The glass can thus be a glass of soda-lime-silica, aluminosilicate or borosilicate type, and the like. Preferably and for reasons of lower production costs, the glass sheet according to the invention is a sheet of soda-lime-silica glass. According to an advantageous embodiment of the invention, the composition of the glass sheet may additionally comprise one or more component (s)/colorant(s) in an appropriate amount as a function of the effect desired. This/these component (s)/colorant(s) may be used, for example, to "neutralize" the colour generated by for example the presence of the chromium and thus to render the colouring of the glass of the invention more neutral or colourless. Alternatively, this/these colorant(s) may be used to obtain a desired colour other than that which can be generated by for example the presence of the chromium.

According to another advantageous embodiment of the invention, which may be combined with the preceding embodiment, the glass sheet can be coated with a layer or a film which makes it possible to modify or neutralize the colour which may be generated by for example the presence of the chromium (for example a coloured PVB film).

The glass sheet according to the invention may advantageously be chemically or thermally tempered in order to enhance the resistivity of the cover part of the exterior trim element.

According to one embodiment of the invention, the glass sheet is coated with at least one transparent and electrically conducting thin layer. A transparent and conducting thin layer according to the invention can, for example, be a layer based on $SnO_2$:F, $SnO_2$:Sb or ITO (indium tin oxide), ZnO:Al or also ZnO:Ga.

According to another advantageous embodiment of the invention, the glass sheet is coated with at least one antireflection layer. An antireflection layer according to the invention may, for example, be a layer based on porous silica having a low refractive index or it may be composed of several layers (stack), in particular a stack of layers of dielectric material alternating layers having low and high refractive indexes and terminating in a layer having a low refractive index. A textured glass sheet may be also used. Etching or coating techniques may as well be used in order to avoid reflection.

According to another embodiment, the glass sheet is coated with at least one anti-fingerprint layer or has been treated so as to reduce or prevent fingerprints. Such a layer or such a treatment may be combined with a transparent and electrically conducting thin layer deposited on the opposite face. Such a layer may be combined with an antireflection layer deposited on the same face, the anti-fingerprint layer being on the outside of the stack and thus covering the antireflection layer.

According to the applications and/or properties desired, other layers can be deposited on one and/or the other face of the glass sheet according to the invention.

The glass sheet according to the invention may be a glass sheet obtained by a floating process, a drawing process, a rolling process or any other process known to manufacture a glass sheet starting from a molten glass composition. According to a preferential embodiment according to the invention, the glass sheet is a float glass sheet. The term "float glass sheet" is understood to mean a glass sheet formed by the float glass process, which consists in pouring the molten glass onto a bath of molten tin, under reducing conditions. A float glass sheet comprises, in a known way, a "tin face", that is to say a face enriched in tin in the body of the glass close to the surface of the sheet. The term "enrichment in tin" is understood to mean an increase in the concentration of tin with respect to the composition of the glass at the core, which may or may not be substantially zero (devoid of tin).

The glass sheet according to the invention can have a thickness varying between 0.1 and 5 mm. Advantageously, the glass sheet according to the invention may have a thickness varying between 0.1 and 3 mm. Preferably, for reasons of weight, the thickness of the glass sheet according to the invention is from 0.1 to 2.2 mm.

The glass sheet may be flat or totally or partially curved to correctly fit with the particular design of the glass support, as the shape required for vehicle or a building . . . . The glass sheet may be body-tinted or coated; it may also be a laminate of a number of plies of glass and plastics. The glass sheet may be tempered.

In another embodiment according to the present invention, the assembly comprising at least a ply of interlayer material and a first and a second busbars according to the present invention is arranged between a first ply of glazing material and second ply of transparent substrate such as glass or plastics or a composite of either or both materials, such as a plastic sheet, a polycarbonate sheet . . . .

According to the present invention, a process is also provided for manufacture of a glazing, comprising the steps:
 a. providing a thermoplastic interlayer
 b. laying a first busbar on the thermoplastic interlayer
 c. laying at least one heating wire over the first busbar
 d. laying a second busbar over the heating wire and the first busbar,
 e. wherein a solder layer suitable for melting in an autoclave covers at least part of a surface of the first busbar or/and the second busbar and is arranged to contact the heating wire.

According to the invention, an adhesive layer is arranged between the first busbar and the second busbar on at least a part of a surface of the first busbar or the second busbar. Thus, the second busbar is preliminarily fixed to the first busbar thanks to an adhesive layer.

According to one preferred embodiment of the present invention, the adhesive layer is arranged on at least a part of a surface of the second busbar.

Thus, the assembly comprising interlayer and the first and the second busbars may be stored before the lamination process for the glass assembly wherein the first and the second busbars with will be finally fixed by melting.

In an advantageous embodiment, the process comprises a step of covering the middle part of the surface of at least one busbar with low melting point solder material. The free part of the low pelting point solder of the surface of at least one busbar may be covered with an adhesive layer.

In another embodiment of the present invention, at least one busbar is covered over all its surface in contact with the other busbar with low melting point solder. For an ease and fasten process, an adhesive strip may be added over apart the surface of the busbar.

Preferably, the adhesive layer is an adhesive strip layer resisting to a temperature of 80 degrees C.

More preferably, the first busbar is a copper strip surrounded by a tin-base alloy, the second busbar is a copper strip surrounded by an alloy with melting temperature lower than 150 degrees C. which melts in glass lamination autoclave process. The advantage of the low-melting point busbar is to provide the good contact quality of a soldering binding method, without the requirement to solder all the busbar length, because the complete melting is achieved during the lamination autoclave process. Preferably, the solder comprises bismuth or indium allowing to reduce the melting point temperature.

In a preferred embodiment, an adhesive strip layer is added on the second busbar and positioned all along its length and only on a portion of its width. This tape allows to paste together the two busbars before the autoclave lamination process in which the remaining surface of low-melting point alloy will melt to solder the two busbars together.

According to the present invention, thin wires and particularly tungsten wires are usually more preferred where the glazing comprises a laminate, since the wires may be positioned between two of the plies making up the laminate, and thereby fixed in position.

The busbars may extend over the glazing from side to side or they may extend from top to bottom, whichever suits the shape of the glazing better.

The thickness of the busbars may be varied to alter their resistance. Where the busbars are metal strip, different thicknesses of strip may be used, typically in the range of 10 to 200 microns. Conductor resistance may be varied to preferentially heat certain areas of the window, or to balance the combined resistance of different groups of unequal numbers of conductors to produce a more uniform heating effect.

When the busbars are fine metal wires, the busbars are preferably formed from metal strip, e.g. tinned copper strip.

Busbars may be tapered or stepped, especially towards their ends. Consequently, references in this specification to busbar width are, unless the context indicates otherwise, references to the width of a part of a busbar (or busbar portion) which is of constant width. Local variations in width, especially a local widening, should be ignored. In the absence of any substantial busbar part of constant width, the reference should be taken to be to the average width of a part of a busbar (or busbar portion). Obviously, the widths of relatively wide and relatively narrow busbar portions are to be considered separately.

Preferably, the busbar may have a width in a range 2 mm to 12 mm, more preferably 4 mm to 10 mm, most preferably 6 mm to 8 mm.

Preferably, the first busbar and/or the second busbar is made of metal, more preferably copper, of thickness in a range 10 μm to 200 μm, most preferably 50 μm to 100 μm.

Preferably, the low melting point solder layer covers substantially all of a surface of the first busbar in contact with the heating wire, or of the second busbar in contact with the heating wire and a solder layer thickness is in a range 1 μm to 50 μm, more preferably 5 μm to 20 μm.

Preferably, the low melting point solder layer melts in a range of 100 degrees C. to 150 degrees C., more preferably 120 degrees C. to 140 degrees C. The advantage of the low-melting point busbar is to provide the good contact quality of a soldering binding method, without the requirement to pre-solder manually or automatically before glass assembly all the busbar length, because the complete melting is achieved during the lamination autoclave process.

In all embodiments of the invention, the glazing is associated with a power supply providing a supply voltage. The busbars have a resistance value such that the busbars are suitable for heating the glazing on application of that voltage, more particularly for heating the glazing to a degree that provides for demisting or de-icing of the glazing.

The invention will now be described by means of non-limiting examples with reference to the figures.

Although the invention is described herein with particular reference to an automotive windscreen, it will be understood that it has applications to other vehicle glazing, for example a rear window or a side window.

Figure 1:
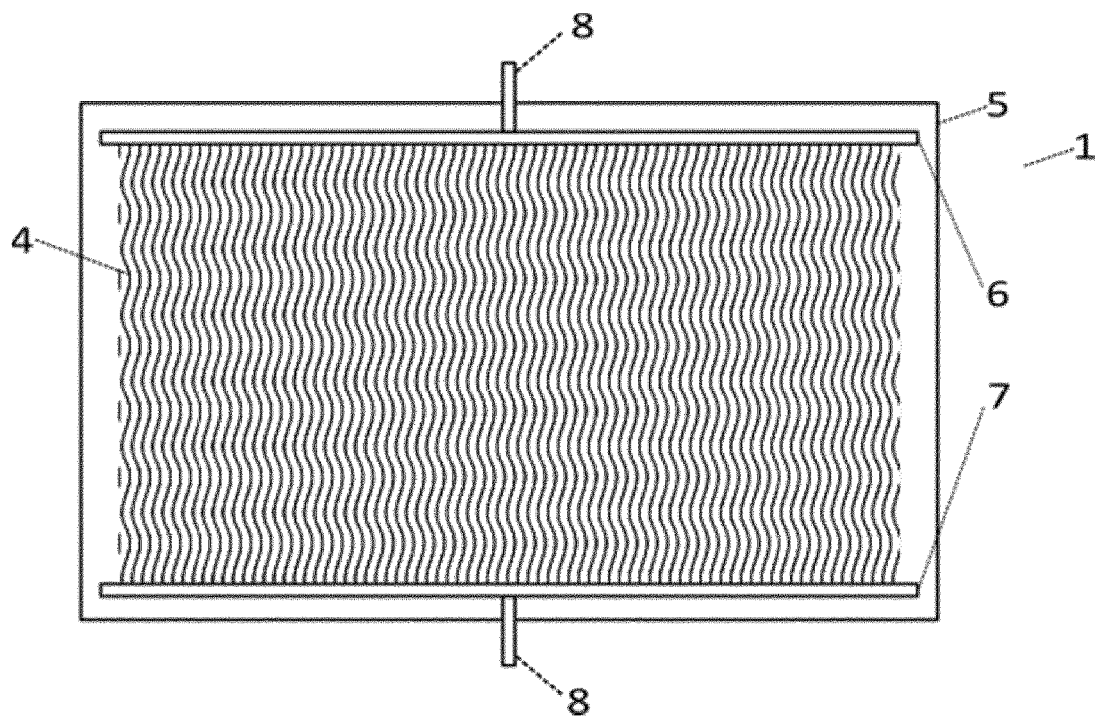
FIG. 1 shows a thermoplastic interlayer comprising an electrical circuit to be laminated in a glazing according to the invention in a plane containing heating wires.
Figure 2:
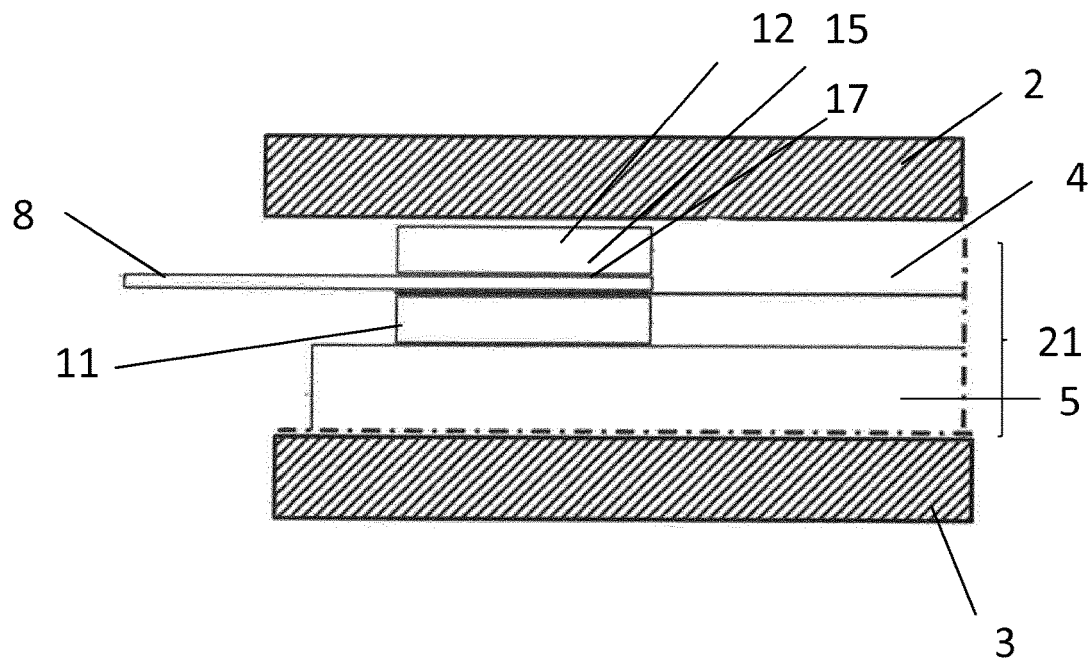
FIG. 2 shows a glazing according to the invention in cross-section, viewed from an end of busbars.
Figure 3:
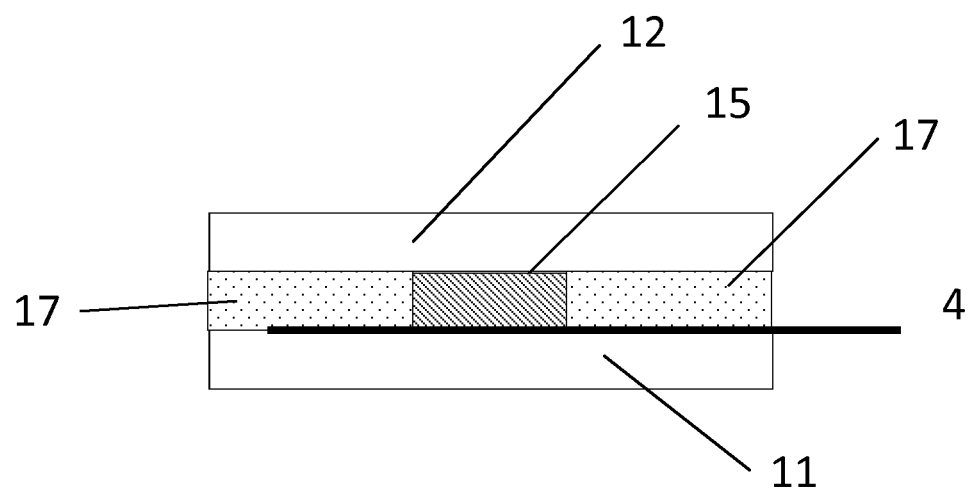
FIG. 3 shows a cross-section of a pair of busbars to be laminated in a glazing according to a preferred embodiment of the invention wherein the second busbar comprises an adhesive layer from either sides of a low the melting point solder disposed on the middle part of the busbar.

FIG. 1 and FIG. 2 shows a glazing 1 composed of two sheet of glass laminated (not shown in FIG. 1 to not overload it) together with a PVB interlayer as a ply of thermoplastic interlayer 5. The glass sheets 2, 3 have same or different thicknesses, in a range from 0.5 to 10 mm. The PVB sheet 5 has a thickness range from 0.1 mm to 10 mm and is prepared separately from the glass assembly process in order to compose on it the electric circuit used for the heating function. The glazing is particularly a laminated windshield 1 for a vehicle, for example a car. One electric circuit 4 extends across the windshield 1. The electric circuit 4 comprises metallic wires, preferably thin wires of tungsten, situated in the interior of the laminated windshield which heat the windshield 1 when current passes through them. Thin metallic wires are connected in parallel at their extremities to a first and a second pairs 6, 7 of first and second busbars 11, 12 as electric connectors.

At the top of the windshield 1, there is first pair top busbar 6, which connects the heating wires to a second pair of busbar 7.

The second pair of busbar 7 connected to the heating wires 4 is situated towards the bottom of the windshield 1 generally in the wiper rest areas. The second pair of busbar 7 is connected to the ground (not shown) of the vehicle. The first and second pair 6, 7 of busbars extend substantially parallel with, the upper and the lower edge of the glazing.

The first and the second pair of busbars comprise a first 11 and a second 12 busbars. In this particular embodiment, the busbars 11, 12 are of metallic strip. Connectors 8 coming out of the laminated assembled glass allows to connect the busbars to an external electric power supply.

If required for electrical connection at only one side of the glazing panel the busbars 11, 12 can be extended on the side of the thermoplastic interlayer (for example PVB) on order to reach the desired connection position. More than two connectors can be used.

According to the present invention, the first busbar 11 and second busbar 12 are arranged on the thermoplastic interlayer.

Thus, in a preferred embodiment, the electric connection at the wire extremities 4 is configured in a superposition of the different electric elements of the circuit ie (i) the first busbar 11 fixed to the PVB 5, (ii) the thin heating wires 4; (iii) the electric connector 8 for the connection outside of the laminated assembly; (iv) the second busbar 12. The two busbars may have same or different widths. To ensure a good electric connection of the wires between the first and the second busbars, a minimum width of 2 mm is preferred.

A connector 8 may be placed on top of the second busbar 12. A low-melting point solder layer may be applied on top surface of the first busbar 11 facing the heating wires 4 or on bottom surface of the second busbar 12.

Thus, as a particular embodiment of the present invention, the first busbar 11 in contact with the thermoplastic interlayer 5, in this case a PVB, could be of different types and then consists of for example a copper metallic stripe covered partially or totally by a tin-base alloy, low-melting point or not, and fixed on the PVB by hot melting of by an adhesive strip applied on the side in contact with the PVB. Thus, a first busbar 11 is laid over the ply of interlayer material 5 and an array of heating wires 4 is laid over the first busbar 11.

The second busbar can be made of different types: (i) a copper strip 12 surrounded by a tin-base alloy and covered on one side by a low-melting point alloy 15, with melting temperature below 150 degrees C.; (ii) a copper stripe 12 surrounded by a low-melting point allow 15, with melting temperature below 150 degrees C.; (iii) a copper stripe 12 covered on one face by a low-melting point alloy 15, with melting temperature below 150 degrees C.

According to one embodiment of the present invention, a second busbar 12 is laid over the heating wires 4 to form the assembly 21. The thermoplastic interlayer 5 such as PVB is arranged on a first ply/sheet of glazing 2 and a second ply/sheet of glazing material 3 is laid over the second busbar 12 as show in FIG. 2. According to one embodiment of the present invention, the second busbar 12 is composed of a layer of adhesive stripe 17 pasted on a low-melting point layer 15. The adhesive strip 17 is placed on the side of the busbar strip 12 facing the first busbar 11, all along the busbar length on a part of the busbar which means that the soldering alloy remain uncovered on a part of the width.

The low melting point solder layer 15 serves two purposes: firstly of improving an electrical connection between the heating wires and the busbars, and secondly of filling the gaps around the heating wires 4, so as to prevent moisture ingress.

In a preferred embodiment of the present invention, the adhesive strip 17 may be placed on one side or on the two sides of the busbar, but in any case the minimum remaining width of uncovered low-melting point alloy 15 must be higher than 2 millimeters to ensure a good electric connection between the heating wires 4 and the busbars 11,12.

In case of use of a strip of low-melting point alloy 15, the adhesive 17 can touch or no the alloy.

In the case of adhesive strip 17 on one side, the adhesive can be placed on the inner or outer edge, related to the PVB edge 5.

Thus, according to the present invention, the process of positioning of heating wires 4 on a ply of thermoplastic interlayer 5 and particularly a PVB interlayer used today remains the same until the stage of the fixation of the second busbar 12. With this invention, the second busbar is pasted on the first busbar 11. Then, the PVB sheet with the electric circuit can be stored, waiting for the lamination of the glass.

An electrically power supply is connected to the laminated glazing by means of external wires, serving as electrodes. A positive electrode is connected to the first pair of busbars, and a negative electrode is connected to the second pair of busbars. It is understood than auxiliary busbars may be used. It is understood that side/lateral busbars may be used. Thus the laminated glazing can be electrically heated.

Thus the heatable glazings of the present invention have uses in all areas where glazings are needed. They have found particular application in vehicles, especially road vehicles, although their use is not limited thereto. Applications also exist in in windows for ships, trains and aircraft, for example.

The invention claimed is:

1. A laminated glazing comprising an assembly which comprises:
   at least a thermoplastic interlayer;
   a first busbar laid over the thermoplastic interlayer;
   at least one heating wire laid over the first busbar; and
   a second busbar at least partly laid over the heating wire and at least partly laid over the first busbar,
   wherein a solder layer suitable for melting in an autoclave covers at least part of a surface of the first busbar or the second busbar and is arranged to contact the heating wire,
   the assembly being laminated with at least a glass sheet, and
   wherein an adhesive layer is arranged between the first busbar and the second busbar on at least a part of a surface of the first busbar or the second busbar.

2. The glazing according to claim 1, wherein the assembly is laminated between two glass sheets.

3. The glazing according to claim 1, wherein an adhesive layer is arranged on at least a part of the surface of one of the first or the second busbar facing the other busbar.

4. The glazing according to claim 1, wherein the second busbar is covered on at least a part of the surface facing the first busbar with a solder layer and with an adhesive layer.

5. The glazing according to claim 1, wherein the adhesive layer is arranged on and all along a length of the first or second busbar and only on a portion of its width.

6. The glazing according to claim 1, wherein the first busbar is a low-melting point busbar and comprises a further adhesive layer on at least one part of its surface to be fixed to the thermoplastic interlayer.

7. The glazing according to claim 1, wherein an electric connection at wire extremities is configured in a superposition of the first busbar fixed to the thermoplastic interlayer, (ii) the at least one heating wire; (iii) the second busbar and an electric connector for a connection outside of the laminated glazing placed between the first and the second busbars or on the second busbar.

8. The glazing according to claim 1, wherein the first busbar is in contact with the thermoplastic interlayer and the second busbar is in contact with the glass sheet.

9. The glazing according to claim 1, wherein the glazing is a wired windshield.

10. The glazing according to claim 1, wherein the first or/and the second busbars are tinned copper strip.

11. The glazing according to claim 1, wherein the busbars have a width in a range 2 mm to 12 mm.

12. The glazing according to claim 1, wherein the at least a heating wire comprises an array of thin wires of tungsten extending across the glazing.

13. A process for manufacture of a glazing, comprising:
   providing a thermoplastic interlayer,
   laying a first busbar on the thermoplastic interlayer,
   laying at least one heating wire over the first busbar,
   laying a second busbar over the heating wire and the first busbar,
   wherein a solder layer suitable for melting in an autoclave covers at least part of a surface of the first busbar or/and the second busbar and is arranged to contact the heating wire, and
   wherein an adhesive layer is arranged between the first busbar and the second busbar on at least a part of a surface of the first busbar or the second busbar.

14. The process according to claim 13, wherein an adhesive layer is arranged between the first busbar and the second busbar on at least a part of a surface of the first busbar or the second busbar.

15. The process according to claim 13, wherein the adhesive layer is arranged on at least a part of a surface of the second bulbar.

16. The glazing according to claim 1, wherein the busbars have a width from 4 mm to 10 mm.

17. The glazing according to claim 1, wherein the busbars have a width from 6 mm to 8 mm.

18. The glazing according to claim 1, wherein the solder layer has a melting temperature of no greater than 150° C.

19. The process according to claim 13, wherein the solder layer has a melting temperature of no greater than 150° C.

* * * * *